May 18, 1965  H. A. DORMAN ETAL  3,184,184
AIRCRAFT HAVING WINGS WITH DIMPLED SURFACES
Filed June 4, 1962
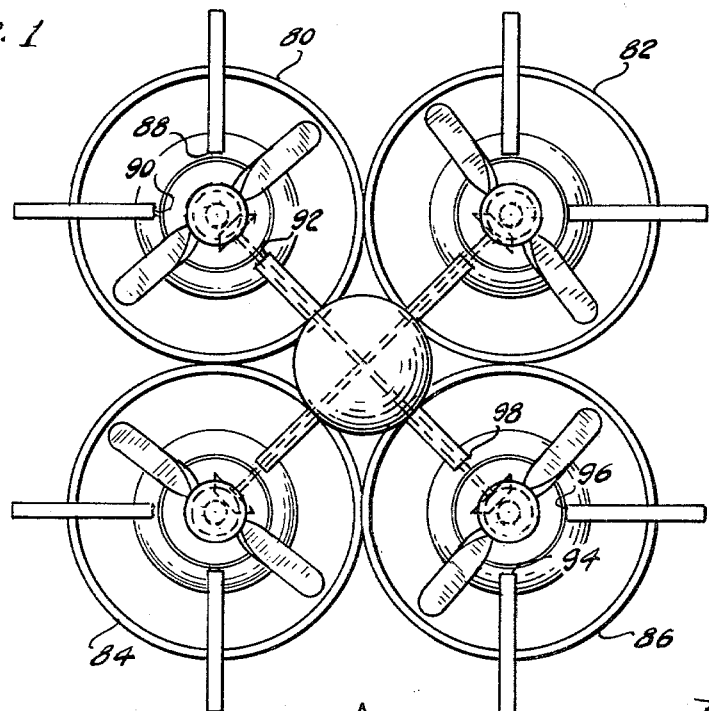
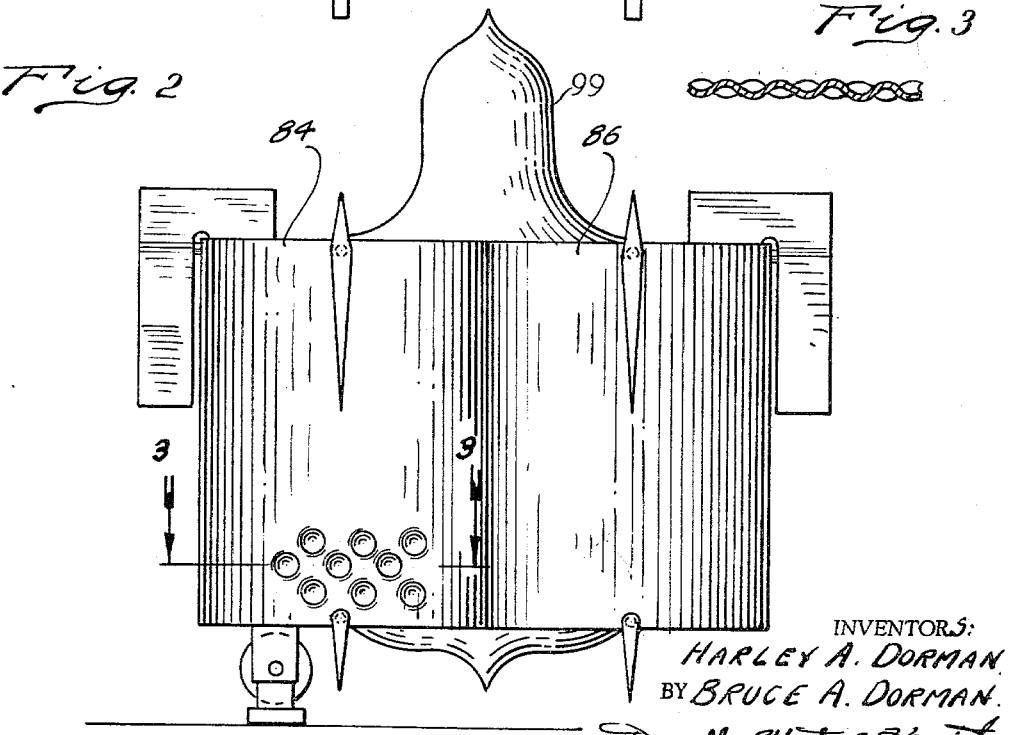
INVENTORS:
HARLEY A. DORMAN
BY BRUCE A. DORMAN
ATTORNEYS

United States Patent Office 3,184,184
Patented May 18, 1965

1

3,184,184
AIRCRAFT HAVING WINGS WITH DIMPLED SURFACES
Harley A. Dorman, 2969 Montclair, Detroit 4, Mich., and Bruce A. Dorman, 430 Saratoga, San Antonio 13, Tex.
Filed June 4, 1962, Ser. No. 199,763
2 Claims. (Cl. 244—41)

Our invention relates generally to aircraft, and more particularly to a multiple engine aircraft wherein provision is made for reducing the degree of viscous shear of the air during flight. It relates also to improvements in the design of surfaces that are subjected to relatively movable viscous fluid.

In a preferred embodiment of our invention, we have provided an aircraft having an even number of annular wings in each of which is mounted an engine and propeller assembly. This embodiment of our invention, which has four such annular wings and which is capable of vertical take-off and landings is formed with an improved surface configuration devised to reduce aerodynamic drag. When all of the engines are operative, the center of thrust coincides with the center of gravity of the aircraft, and the aircraft thus will be in a stable condition.

The provision of an improved aircraft having the characteristics above described being a principal object of our invention, it is a further object of our invention to provide an aircraft of the type above set forth wherein stabilizers with aerodynamic control surfaces are provided in the airstream at the discharge side of each annular wing.

It is a further object of our invention to provide an aircraft of the type above set forth wherein aerodynamically balanced control surfaces are provided at the leading edge of each of the annular wings.

It is a further object of our invention to provide hydrodynamic or fluid flow surfaces that are conditioned for minimum resistance due to viscous shear of the ambient viscous fluid.

Further objects and advantages of our invention will become apparent from the following description and from the accompanying drawings wherein:

FIG. 1 is an aircraft having four annular wings and four cross-coupled engines,

FIG. 2 is a side elevational view of the structure of FIG. 1, and

FIG. 3 is a partial cross sectional view of the wing structure of FIG. 2 taken along section line 3—3 of FIG. 2.

Referring to FIGS. 1 and 2, we have illustrated one form of our invention. This form comprises four annular wings 80, 82, 84 and 86. Three radially extending struts are provided for each end of the wing. The struts for wing 80 are shown at 88, 90 and 92. The struts for wing 86 are shown at 94, 96 and 98. The wings 82 and 84 have corresponding struts that are similarly spaced. A canopy 99 surrounds the forward part of the pilot's compartment, the latter being defined by the annular wings.

A separate engine and propeller assembly is situated in each of the annular wings 80, 82, 84 and 86. These engine and propeller assemblies are supported by the struts for the annular wings.

A drive shaft is disposed within the struts 98 and 92. A cross soupling connection thus is provided between the engine for annular wing 80 and the engine for annular wing 86.

2

There is a similar cross coupling connection between the engines for annular wings 82 and 84.

For a particular description of an aircraft of the type shown in FIGS. 1 and 2 reference may be made to our Patent Number 2,951,661 issued September 6, 1960.

In FIG. 3, we have illustrated the detail of the outer surface of the aircraft of FIGS. 1 and 2. It may be formed with dimples of the type shown. The center of each dimple may be apertured if desired. But regardless of whether they are apertured, they are uniformly distributed over the entire outer surface. This reduces viscous shear losses of the air during flight.

Dimples of this type on a golf ball are known to decrease the viscous shear resistance of the air. The same principle is applied in our invention to reduce the parasitic drag losses due to frictional air resistance during flight. The reducton of viscous shear is especially significant when the aircraft is operated at relatively high speeds.

The outer surfaces of the annular wings are formed from sheet aluminum alloy or the like. The dimples are uniformly distributed and are contiguous. This construction greatly increases the rigidity of the metal and makes it possible to improve the structural stress limits of the aircraft.

Having thus described a preferred embodiment of our invention, what we claim and desire to secure by United States Letters Patent is:

1. A wing having a cambered cross section, said wing comprising an outer surface that is dimpled to form round, contiguous depressions whereby said outer surface provides a minimum degree of viscous shear of the ambient gaseous medium as said wing is moved through said medium in a direction substantially parallel to the plane of said outer surface, said surface normally having a portion parallel to the direction of airflow passing over it, said depressions being located on said surface portion, said rounded depressions each having a spherical form and being arranged uniformly in a regular pattern which comprises a first series of depressions at one axial station and located at a uniform distance from the leading edge of said wing, the depth of each of said depressions being less than half the largest transverse dimension thereof, and another series of similar depressions in an axial station directly adjacent said first station, each of the depressions in said second station being located intermediate two adjacent depressions of the first station at substantially equal distances therefrom the location of any three adjacent depressions defining an equilateral triangle.

2. An annular wing having a cambered cross section, said wing comprising a surface that is dimpled to form round, contiguous depressions whereby said surface provides a minimum degree of viscous shear of the ambient gaseous medium as said wing is moved through said medium in a direction substantially parallel to the plane of said surface, said surface normally having a portion parallel to the direction of airflow passing over it, said depressions being located on said surface portion, said rounded depressions each having a spherical form and being arranged uniformly in a regular pattern which comprises a first series of depressions at one axial station and located at a uniform distance from the leading edge of said wing, the depth of each of said depressions being less than half the largest transverse dimension thereof, and another series of similar depressions in an axial station directly adjacent said first station, each of the depressions in said second station being located intermediate two adjacent depressions of the first station at substantially equal distances therefrom the location of any three adjacent depressions defining an equilateral triangle.

References Cited by the Examiner

UNITED STATES PATENTS

| | | | |
|---|---|---|---|
| 1,907,160 | 5/33 | Schauman | 244—23 |
| 2,261,558 | 11/41 | Orloff | 244—130 |
| 2,452,281 | 10/48 | Zimmerman | 244—60 |
| 2,462,824 | 2/49 | Zimmerman | 244—60 |
| 2,929,580 | 3/60 | Ciolkosz | 244—34 X |
| 2,951,661 | 9/60 | Dorman et al. | 244—34 X |
| 3,017,139 | 1/62 | Binder | 244—12 |
| 3,039,719 | 6/62 | Platt | 244—12 X |
| 3,065,929 | 11/62 | Holland | 244—12 |

FOREIGN PATENTS

| | | |
|---|---|---|
| 418,418 | 4/27 | Germany. |
| 730,121 | 5/55 | Great Britain. |

FERGUS S. MIDDLETON, *Primary Examiner.*

MILTON BUCHLER, ANDREW H. FARRELL,
*Examiners.*